(12) United States Patent
Nakamura et al.

(10) Patent No.: US 8,576,974 B2
(45) Date of Patent: *Nov. 5, 2013

(54) APPARATUS FOR ULTRASONIC INSPECTION OF REACTOR PRESSURE VESSEL

(75) Inventors: Motoyuki Nakamura, Hitachi (JP); Yoshio Nonaka, Hitachi (JP); Naoyuki Kono, Mito (JP); Masahiro Miki, Tokai (JP); Satoshi Shinohara, Tokai (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 80 days.

This patent is subject to a terminal disclaimer.

(21) Appl. No.: 12/986,579

(22) Filed: Jan. 7, 2011

(65) Prior Publication Data

US 2011/0096888 A1    Apr. 28, 2011

Related U.S. Application Data

(63) Continuation of application No. 12/190,883, filed on Aug. 13, 2008, now Pat. No. 7,929,656.

(30) Foreign Application Priority Data

Aug. 20, 2007    (JP) .................................. 2007-213610

(51) Int. Cl.
*G21C 17/003* (2006.01)
*G21C 17/007* (2006.01)

(52) U.S. Cl.
USPC ....................................................... 376/249

(58) Field of Classification Search
USPC ....................................................... 376/249
See application file for complete search history.

(56) References Cited

U.S. PATENT DOCUMENTS

| | | | | |
|---|---|---|---|---|
| 3,020,887 A | * | 2/1962 | Hobson et al. | 92/26 |
| 4,010,636 A | * | 3/1977 | Clark et al. | 73/637 |
| 4,165,649 A | * | 8/1979 | Greer, Jr. | 73/644 |

(Continued)

FOREIGN PATENT DOCUMENTS

| JP | 05-288736 | 11/1993 |
|---|---|---|
| JP | 06-011595 | 1/1994 |

(Continued)

OTHER PUBLICATIONS

Office Action in Japanese Application No. 2007-213610, mailed Oct. 12, 2010.

(Continued)

*Primary Examiner* — Jack W Keith
*Assistant Examiner* — Sean P Burke
(74) *Attorney, Agent, or Firm* — Brundidge & Stanger, P.C.

(57) ABSTRACT

An object of the present invention is to provide an inspection apparatus for inspecting weld zones in a reactor pressure vessel, the inspection apparatus comprising: an ultrasonic probe 6 for emitting an ultrasonic wave; a probe holding unit 60 for holding the ultrasonic probe 6 such that a ultrasonic wave transmitting surface of the ultrasonic probe 6 is kept in direct contact with or at a constant distance from the outer surface of the reactor pressure vessel 1; a pressing unit 50 for pressing the probe holding unit 60 parallel to a central axis of a control rod drive housing 8 against the reactor pressure vessel; and a rotator 40 for rotating the probe holding unit 60 and the pressing unit 50 about the central axis of the control rod drive housing 8.

4 Claims, 5 Drawing Sheets

(56) References Cited

U.S. PATENT DOCUMENTS

| | | | | |
|---|---|---|---|---|
| 4,518,560 A | * | 5/1985 | Takaku et al. | 376/245 |
| 5,109,718 A | * | 5/1992 | Gugel et al. | 73/866.5 |
| 5,396,800 A | * | 3/1995 | Drinon et al. | 73/623 |
| 2008/0037695 A1 | * | 2/2008 | Kono et al. | 376/249 |

FOREIGN PATENT DOCUMENTS

| | | | |
|---|---|---|---|
| JP | 07063704 | | 3/1995 |
| JP | 09281273 | | 10/1997 |
| JP | 2002-257794 | | 9/2002 |
| JP | 2002-257800 | | 9/2002 |
| JP | 2002257800 A | * | 9/2002 |
| JP | 2002-311004 | | 10/2002 |
| JP | 2002311004 A | * | 10/2002 |
| JP | 2004-037390 | | 2/2004 |
| JP | 2004037390 A | * | 2/2004 |
| JP | 2004-170399 | | 6/2004 |
| JP | 2004170399 A | * | 6/2004 |
| JP | 2005-127870 | | 5/2005 |
| JP | 2005127870 A | * | 5/2005 |
| JP | 2006-234701 | | 9/2006 |
| JP | 2007063704 A | * | 3/2007 |
| JP | 4096014 | | 3/2008 |
| JP | 2009281273 A | * | 12/2009 |

OTHER PUBLICATIONS

Takehiro Arakawa, "Technology course, Non-destructive testing technique, The 6$^{th}$ Recent ultrasonic wave inspection" IIC Review, IHI Inspection & Instrumentation Co., Ltd. Apr. 2006, No. 35, pp. 2-11, retrieved from the Internet on Oct. 4, 2010, URL: http://www.iic-hq.co.jp/library/035.html.

* cited by examiner

APPARATUS FOR ULTRASONIC INSPECTION OF REACTOR PRESSURE VESSEL

This application is a continuation application of U.S. application Ser. No. 12/190,883, filed Aug. 13, 2008, now U.S. Pat. No. 7,929,656, the entirety of which is incorporated herein by reference.

BACKGROUND OF THE INVENTION

1. Field of the Invention

The present invention relates to inspection apparatuses for inspecting a weld zone between a reactor pressure vessel and a structure inside a nuclear reactor. For example, the invention relates to an inspection apparatus for inspecting weld zones in a reactor pressure vessel, the inspection apparatus being capable of detecting a crack of a weld zone between a control rod drive housing and a reactor pressure vessel, which are located on the bottom of a boiling water reactor.

2. Description of the Related Art

In a pressure vessel of a nuclear reactor, it is necessary to check its soundness; in particular, weld zones and the like in the nuclear reactor need to be inspected. In most cases, visual inspection is performed periodically. If it is judged that further inspection is necessary as a result of the visual inspection, situational tests of the surface and inside of the material are carried out (the size of a crack is measured). Well known methods for the above inspection include ultrasonic testing and eddy current testing.

In addition, inspection areas often exist in narrow portions; therefore, as a method for improving such inspection efficiency, there is disclosed an inspection method in which a lower head of a pressure vessel of the nuclear reactor is inspected by use of a scanning cart that travels while adhering to the lower head (for example, refers to JP-A-6-11595).

SUMMARY OF THE INVENTION

A reactor pressure vessel is equipped with a control rod drive housing, an in-core monitor housing, a shroud support, and the like. The control rod drive housing, which is located in a nuclear reactor, is a tube for storing a mechanism for driving a control rod that is used for the output control of the nuclear reactor. The control rod drive housing is mounted onto the reactor pressure vessel by welding in such a manner that the control rod drive housing penetrates the bottom of the reactor pressure vessel.

In addition, the in-core monitor housing is a tube for storing a monitor that is used to monitor neutrons generated by nuclear fission in the nuclear reactor. The in-core monitor housing is mounted onto a build-up weld inside the reactor pressure vessel by welding in such a manner that the in-core monitor housing penetrates the bottom of the reactor pressure vessel.

Moreover, the shroud support is provided in order that structures inside the nuclear reactor are supported. The shroud support is mounted onto the inner surface of the reactor pressure vessel by welding. The weld zone is located inside the reactor pressure vessel that is a pressure boundary, or the weld zone itself is a withstand pressure boundary. The inner bottom surface of the reactor pressure vessel is subjected to cladding processing by welding. The weld zone and the build-up weld are attached to this cladding portion.

The weld zones of the reactor pressure vessel are located in areas where devices inside the reactor pressure vessel are closely placed; their spaces are narrow, and their shapes are complex. Accordingly, the accessibility of the inspection apparatus within the reactor pressure vessel is limited. Presently, when some form of abnormality is found by visual inspection, a situational test is conducted on the surface of and the inside of the weld material by placing a sensor (probe) against or close to those complex and narrow areas.

Since inspection areas are thus complex and narrow, a certain level of skill has been required to have the inspection apparatus and the probe approach those areas. Furthermore, since weld materials to be inspected change in three-dimensional shape, inspection needs to be preformed with their curvatures and surface states in mind especially when the ultrasonic testing is to be applied. Also, because of largeness and poor ultrasonic propagation properties of the weld portions, the ultrasonic testing occasionally involves difficulty when it is performed toward a deeper region from the inner surface of the reactor pressure vessel.

The present invention has been made on the basis of the foregoing facts and circumstances, and an object of the present invention is to provide an inspection apparatus for inspecting weld zones in a reactor pressure vessel, the inspection apparatus being capable of easily approaching three-dimensionally shape-changing weld zones present at complex and narrow portions and of accurately performing inspection.

In order to achieve the above object, in a first aspect of the present invention, the invention is an inspection apparatus for inspecting weld zones in a reactor pressure vessel, the inspection apparatus inspecting a weld zone of a control rod drive housing and an area in proximity to the weld zone, the control rod drive housing being placed from the bottom of the reactor pressure vessel to the inside thereof, the inspection apparatus comprising:

a probe for emitting an ultrasonic wave;

a probe holding unit for holding the probe such that an ultrasonic wave transmitting surface of the probe is kept in direct contact with or at a constant distance from the outer surface of the reactor pressure vessel;

a pressing unit for pressing the probe holding unit parallel to the central axis of the control rod drive housing against the reactor pressure vessel; and a rotator for rotating the probe holding unit and the pressing unit around the central axis of the control rod drive housing.

In addition, in a second aspect of the present invention, the invention is the inspection apparatus according to the first aspect, wherein the longer side of the ultrasonic wave transmitting surface of the probe if said surface is rectangular-shaped or the major axis of said surface if said surface is oval-shaped or circular-shaped is set to a value selected from 35 mm to 120 mm.

In addition, in a third aspect of the present invention, the invention is the inspection apparatus according to the second aspect, wherein the reactor pressure vessel and an area to be inspected inside the reactor pressure vessel are provided by the probe with an ultrasonic field within a range of −6 db with respect to a focus of the ultrasonic wave or the echo intensity of the focus.

In addition, in a fourth aspect of the present invention, the invention is the inspection apparatus according to the first aspect, the inspection apparatus further comprising an elevator for moving up and down the probe, the probe holding unit, the pressing unit, and the rotator along the control rod drive housing.

In addition, in a fifth aspect of the present invention, the invention is the inspection apparatus according to the fourth aspect, wherein the longer side of the ultrasonic wave transmitting surface of the probe if said surface is rectangular-shaped or the major axis of said surface if said surface is oval-shaped or circular-shaped is set to a value selected from 35 mm to 120 mm.

Moreover, in a sixth aspect of the present invention, the invention is the inspection apparatus according to the fifth aspect, wherein the reactor pressure vessel and an area to be inspected inside the reactor pressure vessel are provided by the probe with an ultrasonic field within a range of −6 db with respect to a focus of the ultrasonic wave or the echo intensity of the focus.

Furthermore, in a seventh aspect of the present invention, the invention is the inspection apparatus according to the first or second aspect, wherein the probe can inspect a weld zone between the reactor pressure vessel and a structure inside an nuclear reactor, a built-up weld, and an inner-surface cladding portion of the reactor pressure vessel.

According to the present invention, the ultrasonic probe can easily approach three-dimensionally shape-changing weld zones present at complex and narrow portions and perform the inspection accurately.

DESCRIPTION OF THE PREFERRED EMBODIMENTS

An embodiment of an inspection apparatus for inspecting weld zones in a reactor pressure vessel according to the present invention will be described below with reference to the accompanying drawings.

Figure 1:
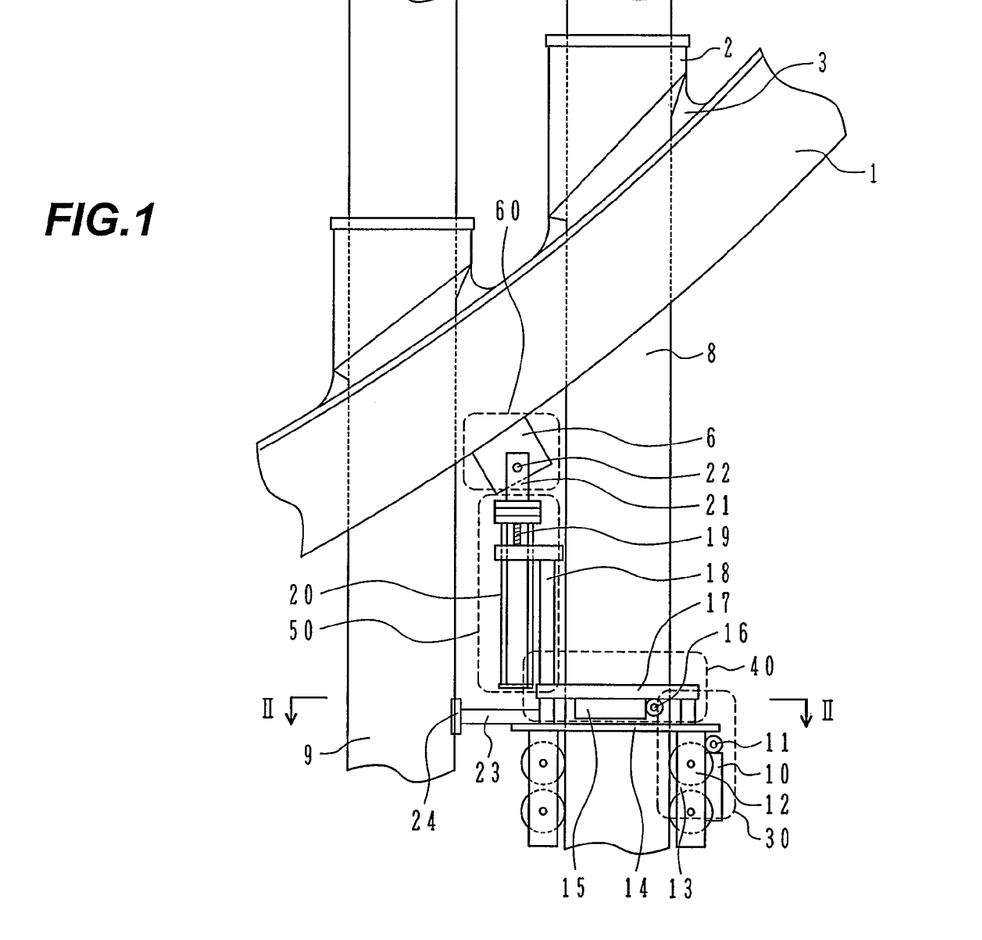
FIG. 1 is a front view illustrating an example in which one embodiment of an inspection apparatus according to the present invention is applied to the inspection of a weld zone of a control rod drive stub tube that is attached to a reactor pressure vessel.
Figure 2:
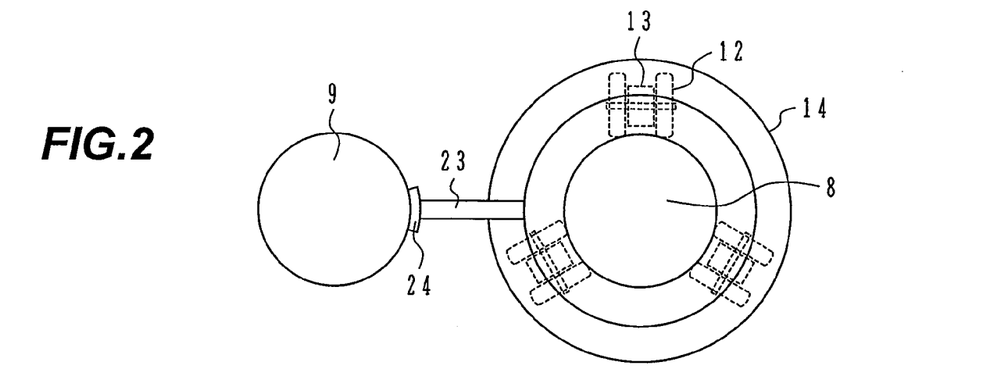
FIG. 2 is a plan view as viewed from the direction of the arrow II-II in FIG. 1.

FIGS. 1 and 2 are diagrams illustrating an inspection apparatus for inspecting weld zones in a reactor pressure vessel according to one embodiment of the present invention. To be more specific, FIG. 1 is a front view illustrating an example in which the present invention is applied to the inspection of weld zones of a control rod drive stub tube that is mounted onto a reactor pressure vessel; and FIG. 2 is a plan view as viewed from the direction of the arrow II-II in FIG. 1. First of all, as one embodiment of the inspection apparatus for inspecting weld zones in the reactor pressure vessel according to the present invention, how the control rod drive stub tube, mounted onto the reactor pressure vessel, and weld zones of the control rod drive stub tubes are configured will be described with reference to FIG. 1.

A control rod drive stub tube 2 is secured to the inside of a reactor pressure vessel 1 by a weld zone 3. A control rod drive housing 8 is inserted into and secured to the control rod drive stub tube 2. In order to inspect the weld zone 3 of the control rod drive stub tube 2 that is mounted onto the reactor pressure vessel 1, an ultrasonic probe 6 is placed on the outer surface side of the reactor pressure vessel 1 so that the ultrasonic probe 6 emits an ultrasonic wave toward the inner surface side of the reactor pressure vessel 1.

The incident ultrasonic wave reaches the inside of the weld zone 3 of the control rod drive stub tube 2 or reaches an inner-surface cladding portion 200. If a crack exists there, the reflection of the ultrasonic wave from the position of the crack is detected. The depth of the crack inside the weld zone 3 can be evaluated by identifying the position at which the ultrasonic wave is reflected.

The size of the ultrasonic probe 6 needs to be set in consideration of the accessibility of the ultrasonic probe 6 to a narrow portion, the thickness of the reactor pressure vessel 1, and the like. This point described in detail, the reactor pressure vessel 1 has a thickness of about 150 mm or more. If the end face of the weld zone 3 is included, the reactor pressure vessel 1 is about 200-mm thick. In order to detect a crack existing in the weld zone 3 by use of an ultrasonic wave, it is necessary to emit the ultrasonic wave to the area whose thickness ranges from about 150 mm to 200 mm. In addition, in order to acquire a sufficiently strong signal from the reflection source of a flaw such as a crack, it is necessary to properly converge the ultrasonic wave on the above area so as to perform inspection.

The criterion for selecting a proper focus area of the ultrasonic wave when inspection is performed from the outer surface of the reactor pressure vessel 1 is now explained with reference to FIG. 3.

Figure 3:
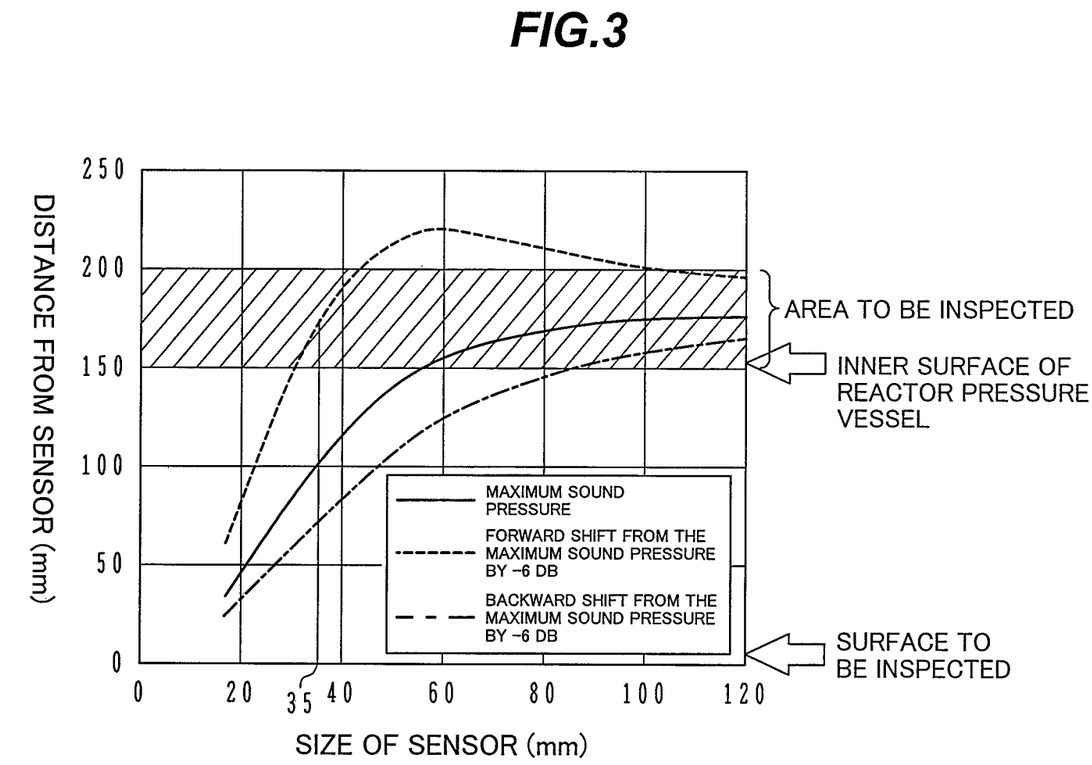
FIG. 3 is a characteristics chart illustrating the relationship between the size of a probe (transducer or sensor) and a proper focus area of an ultrasonic wave in an inspection apparatus according to one embodiment of the present invention.

In FIG. 3, the horizontal axis indicates the size of the transducer of the ultrasonic probe (sensor); the vertical axis indicates the distance from the sensor (more specifically, the distance in the thickness direction in which inspection is performed). The size of the sensor is expressed as the size of the long side of the sensor or the size of the long axis of the sensor because it is known that the focus settable area of an ultrasonic wave generated by the sensor depends on the size of the long side if the sensor has a rectangular shape including a square and depends on the size of the long axis if the sensor has an oval shape including a circle. In FIG. 3, the solid line indicates maximum sound pressure characteristics; the dotted line indicates sound pressure characteristics obtained when a forward shift from the maximum sound pressure is made by −6 dB; and the alternate long and short dash line indicates sound pressure characteristics obtained when a backward shift from the maximum sound pressure is made by −6 dB.

When the ultrasonic probe 6 is placed on the outer surface of the reactor pressure vessel 1, the size of the sensor can be set at a value ranging from 35 mm to 120 mm, as shown in FIG. 3, in order that an effective focus area (within a range of −6 dB from the maximum sound pressure height) reaches an area to be inspected ranging from 150 mm to 200 mm. In particular, when a narrow portion is to be inspected, the size of the sensor can be set at 35 mm at minimum; it is desirable that the size of the sensor be 45 mm.

Next, one embodiment of the inspection apparatus using the ultrasonic probe 6 whose size has been set as above will be described with reference to FIGS. 1 and 2 again.

In one embodiment of the inspection apparatus according to the present invention, because the weld zone 3 exists 360 degrees around the control rod drive stub tube 2, the inspection apparatus also rotates 360 degrees so as to inspect the whole target area. In addition, in order to locate the position of the ultrasonic probe 6 or an ultrasonic wave inspection position, the inspection apparatus has the function of setting the position at which the main body of the inspection apparatus is placed. Moreover, because the lower surface of the reactor pressure vessel 1 has a spherical shape and because the tilt of the surface accessed by the ultrasonic probe 6 becomes larger as the ultrasonic probe 6 moves from the center of the nuclear reactor toward its outside, the inspection apparatus has the function of adjusting the posture of the ultrasonic probe 6 to the shape of an inspection area.

For the purpose of achieving the above-described functions, the inspection apparatus according to one embodiment of the present invention is configured such that the main body of the access device is placed and secured around the control rod drive housing 8. The inspection apparatus includes an elevator 30 for moving up and down the whole inspection apparatus along the control rod drive housing 8; a rotator 40 for rotating the ultrasonic probe 6 360 degrees around the control rod drive housing 8; a height adjustment unit (pressing mechanism) 50 for adjusting the height-directional distance between the reactor pressure vessel 1 and the whole inspection apparatus; and a probe holding unit 60 including a probe-posture adjustment mechanism 21 for adjusting the posture of the ultrasonic probe 6 to the surface of the reactor pressure vessel 1.

Besides the method in which the inspection apparatus is secured around the control rod drive housing 8 as shown in this embodiment, an alternatively possible method is one in which the position of the inspection apparatus is set by measuring the reference distance between the inspection apparatus and the control rod drive housing 8 by use of, for example, an ultrasonic wave range finder or a laser range finder while keeping the distance constant.

As a function of the probe holding unit 60, if the ultrasonic probe 6 is pressed against a wall surface of the reactor pressure vessel 1, the ultrasonic probe 6 rotates around a pin 22 attached to the probe-posture adjustment mechanism 21 that functions as a gimbal. This makes it possible to arbitrarily change the angle of the ultrasonic probe 6 in response to the slant of the reactor pressure vessel 1. As a result, the ultrasonic probe 6 can stably move along the surface of the reactor pressure vessel 1.

When inspection is performed, besides the method in which the ultrasonic probe 6 is kept in direct contact with the outer surface of the reactor pressure vessel 1, the ultrasonic probe 6 may also be provided with a spacer or the like on the sound-wave-generating-surface side of the ultrasonic probe 6 so that the distance between the ultrasonic probe 6 and the reactor pressure vessel is kept constant.

The probe holding unit 60 is attached to the height adjustment unit 50. The height adjustment unit 50 is mounted onto the rotator 40. The height adjustment unit 50 includes a fixed frame 18 that is secured to the rotator 40; a guide 20 guided by this fixed frame 18, the upper end of which is connected to the probe holding unit 60; and a spring 19 that is disposed between the fixed frame 18 and the probe holding unit 60. Even when the whole inspection apparatus is further lifted after the ultrasonic probe 6 is brought into contact with the reactor pressure vessel 1, the ultrasonic probe 6 can be kept in contact with the reactor pressure vessel 1 by the contraction of the spring 19.

The rotator 40 is disposed on the top surface of a base 14 whereas the elevator 30 is disposed on the bottom surface of the base 14. The elevator 30 includes a fixed stand 13 that is located on the lower surface side of the base 14; an elevator wheel 12 provided on the fixed stand 13; an elevator motor 10 also mounted onto the fixed stand 13; and a gear 11 for transferring the rotational force of the elevator motor 10 to the elevator wheel 12. Driving of the elevator motor 10 rotates the elevator wheel 12, which moves up or down the whole inspection apparatus along the control rod drive housing 8.

The rotator 40 includes a rotator table 17 located on the upper surface side of the base 14; a rotator motor 15 that is mounted on the upper surface side of the base 14; and a gear 16 for transferring the rotational force of the rotator motor 15 to the rotator table 17. The rotation of the rotator motor 15 causes the rotator table 17 to rotate around the control rod drive housing 8. The rotation of the rotator table 17 causes the ultrasonic probe 6 to rotate 360 degrees around the axis of the control rod drive housing 8. The position of the ultrasonic probe 6 or an ultrasonic wave inspection position can be identified by a sensor detecting the rotational angle of the rotator table 17 or detecting the distance traveled by the inspection apparatus around the control rod drive housing, which distance can be converted from the rotational angle.

The base 14 of the rotator 40 is provided with a positioning pad 24 through an arm 23. As shown in FIG. 2, placed against the side surface of a control rod drive housing 9 adjacent to the control rod drive housing 8 to which the inspection apparatus is attached, the positioning pad 24 determines the position of the whole inspection apparatus in its rotational direction.

In place of the mechanical positioning method using the arm 23 and the positioning pad 24, an ultrasonic-wave or laser range finder can be used; with the use of such a device, each distance from one or more adjacent control rod drive housings 9 to the control rod drive housing 8 can be measured to compute the current position of the inspection apparatus and thereby to locate the position of the ultrasonic probe 6 or of an ultrasonic wave inspection.

Next, the operation of the above-described inspection apparatus according to one embodiment of the present invention in which weld zones of the control rod drive stub tube are inspected will be described with reference to FIGS. 4 through 6.

Figure 4:
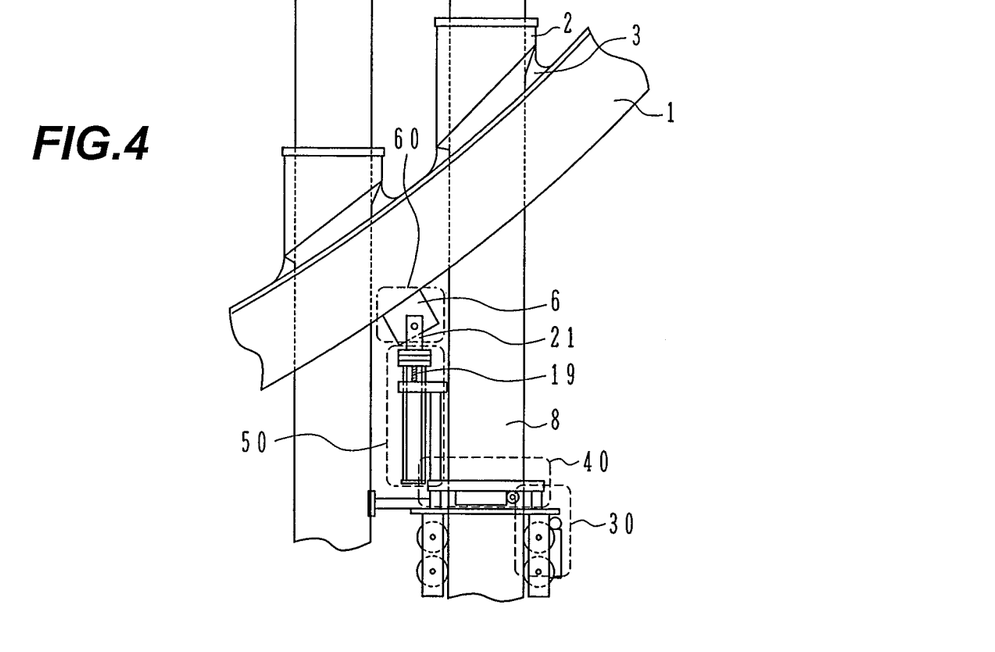
FIG. 4 is a diagram illustrating the operation of inspecting a weld zone of a control rod drive stub tube with an inspection apparatus according to one embodiment of the present invention attached to a reactor pressure vessel.
Figure 5:
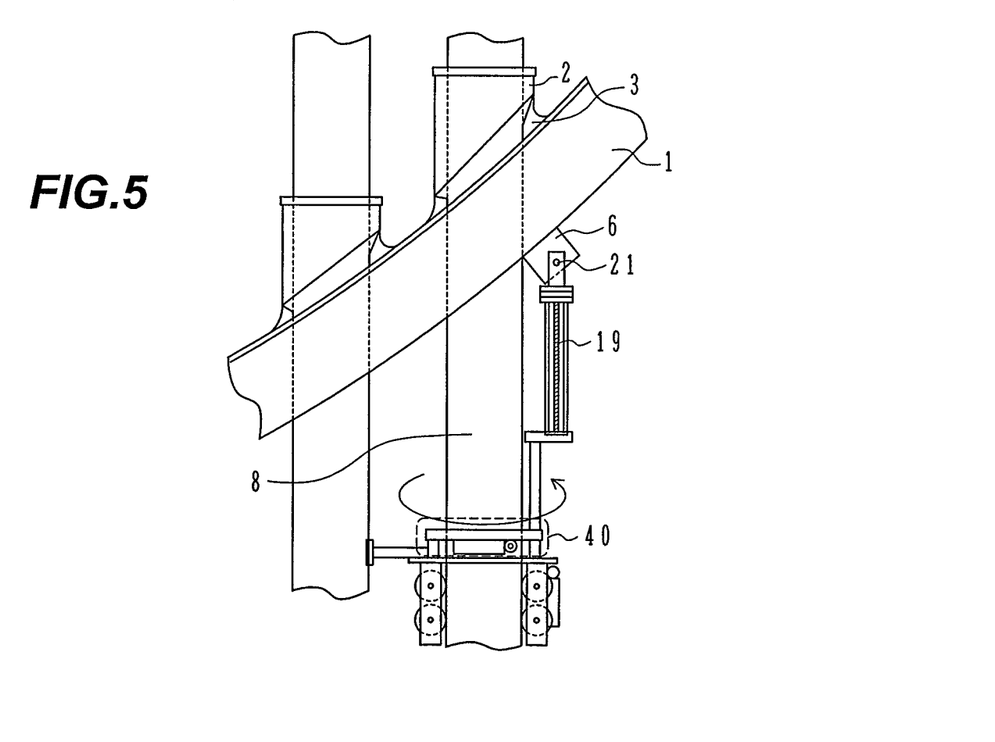
FIG. 5 is another diagram illustrating the operation of inspecting a weld zone of a control rod drive stub tube with an inspection apparatus according to one embodiment of the present invention attached to a reactor pressure vessel.

FIG. 4 is a diagram illustrating, as the initial access state of an inspection apparatus according to one embodiment of the present invention, the state in which the inspection apparatus is located at a surface of the bottom side in the reactor pressure vessel 1 of the control rod drive housing 8. First of all, the ultrasonic probe 6 is mounted onto the inspection apparatus (step 600 in FIG. 6). Focus position settings for the ultrasonic probe 6 are then performed (step 601 in FIG. 6). After that, the inspection apparatus is attached to the control rod drive housing 8 (step 602 in FIG. 6).

Figure 6:
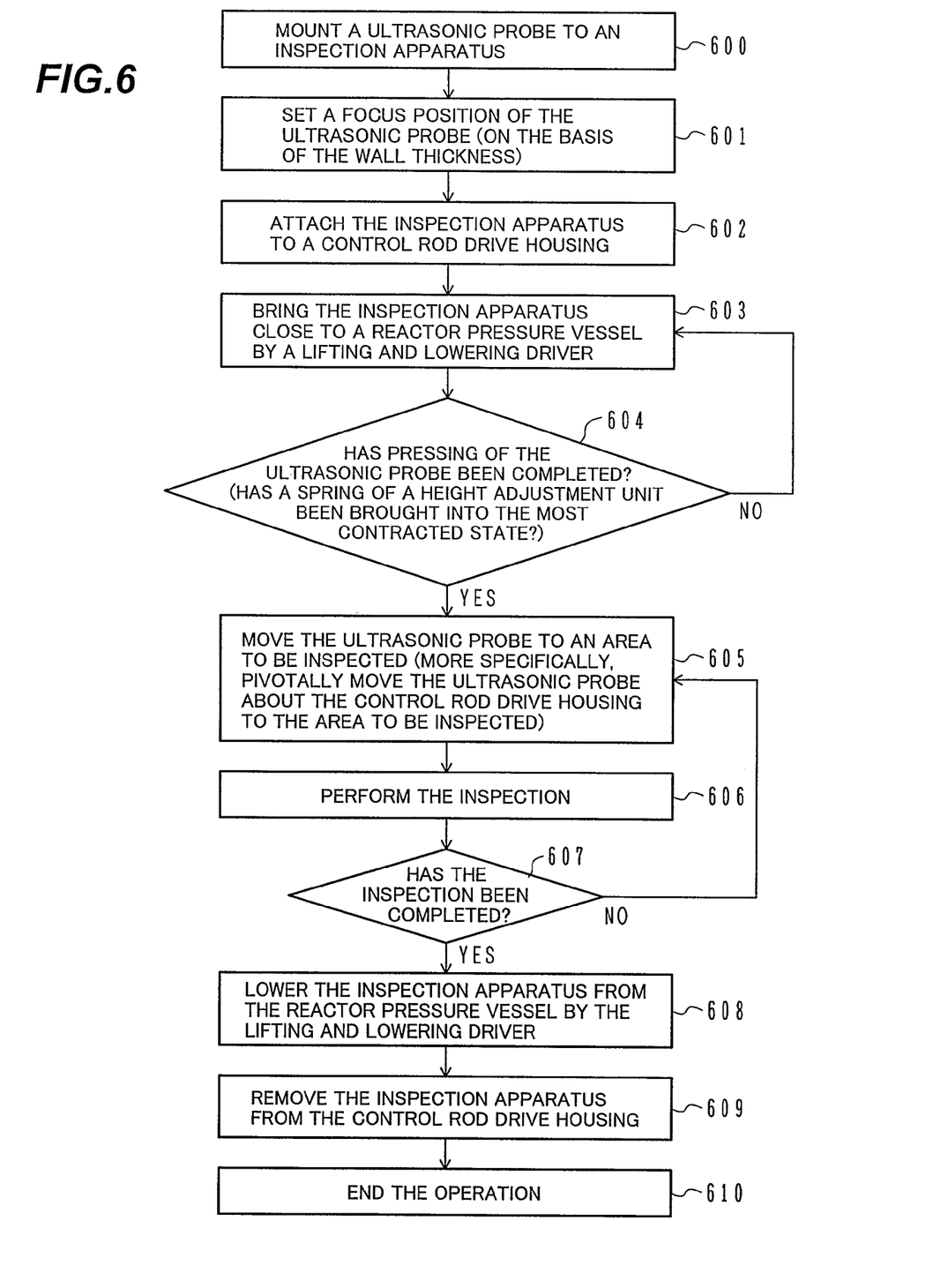
FIG. 6 is a flowchart illustrating the inspection operation of an inspection apparatus according to one embodiment of the present invention.

Next, the ultrasonic probe 6 is pressed against the reactor pressure vessel 1 by the elevator 30 (step 603 in FIG. 6) so that the spring 19 of the height adjustment unit 50 is brought into the most contracted state (step 604 in FIG. 6). Proper pressing of the ultrasonic probe 6 is checked by emitting an ultrasonic wave toward the reactor pressure vessel 1 to judge whether or not the ultrasonic wave reflected at its inner bottom surface can be externally acquired through its inner surface.

Next, the rotator 40 rotates the ultrasonic probe 6 around the control rod drive housing 8 to a position at which inspection is required (step 605 in FIG. 6), and the inspection is then performed (step 606 in FIG. 6). FIG. 5 is a diagram illustrating the state in which the inspection apparatus is positioned at a surface of the upper side in the reactor pressure vessel 1 of the control rod drive housing 8. In this case, the expansion of the spring 19 continuously presses the ultrasonic probe 6 against the reactor pressure vessel 1, and the probe-posture adjustment mechanism 21 adjusts the posture of the probe 6. Thus, sufficient adjustability of the probe 6 to the outer surface of the reactor pressure vessel 1 can be ensured.

After the completion of the inspection (step 607 in FIG. 6), the elevator 30 lowers the ultrasonic probe 6 to a lower portion of the reactor pressure vessel 1 (step 608 in FIG. 6). The inspection apparatus is then removed from the control rod drive housing 8 (step 609 in FIG. 6), and this completes the operation (step 610 in FIG. 6).

The above-described operation control enables the ultrasonic probe 6 to access an arbitrary region around the control rod drive housing 8. Moreover, inspection with high accuracy can be performed by use of the probe holding unit 60 which stably adjusts the posture of the ultrasonic probe 6 and the positioning mechanism 24 of the inspection apparatus.

Figure 7:
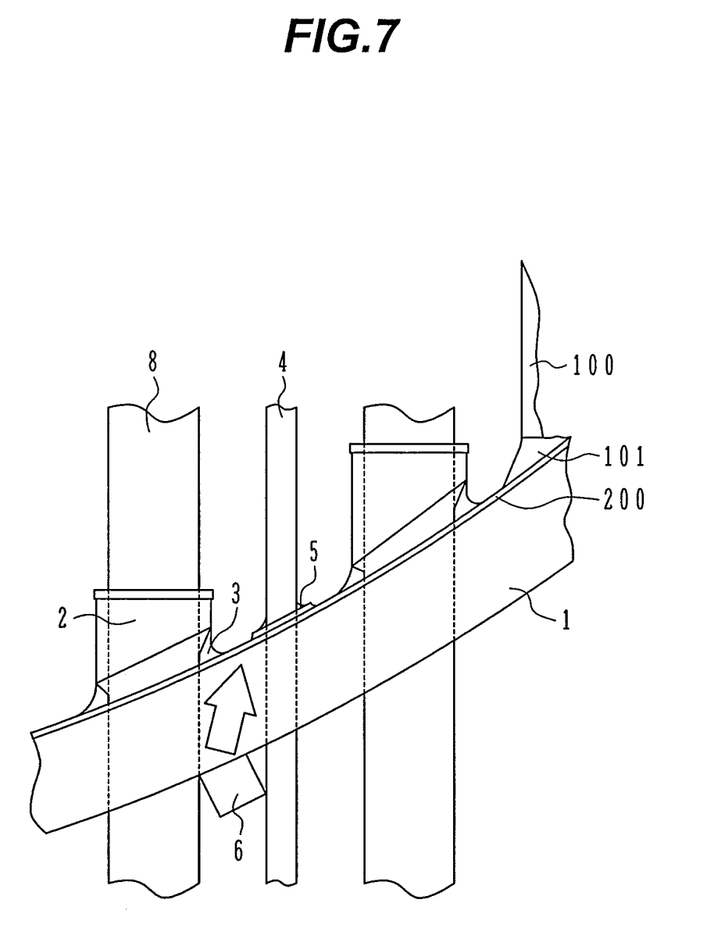
FIG. 7 is a front view illustrating examples of other weld zones of the reactor pressure vessel to which an inspection apparatus according to one embodiment of the present invention can be applied.

The above embodiment describes the example in which the inspection apparatus according to the present invention is applied to the inspection of the weld zone 3 of the control rod drive stub tube 2. Not limited to this, the inspection apparatus according to the present invention can also be applied to a case where a weld zone 5 of an in-core monitor housing 4, a weld zone 101 of a shroud support 100, and an inner-surface cladding portion 200, which are shown in FIG. 7, are inspected from the outer surface of the reactor pressure vessel 1 by the ultrasonic inspection.

In addition, in the above embodiment, the spring 19 is used to stably adjust the posture of the ultrasonic probe 6 to the wall surface shape of the reactor pressure vessel 1. However, instead of using the spring 9, a cylinder mechanism can also be used.

According to the above embodiment of the present invention, after the inspection apparatus is correctly positioned, inspection can be performed with the posture of the ultrasonic probe 6 stably adjusted to the wall surface of the reactor pressure vessel 1. Therefore, the probe 6 can easily approach three-dimensionally shape-changing weld zones present at complex and narrow portions and perform inspection accurately there. Moreover, the size of a crack present in a weld zone of a structure inside the nuclear reactor can be simply and easily measured without employing underwater remote control for access to a complex and narrow region. Furthermore, deep areas of weld zones, which was conventionally difficult to inspect by an ultrasonic wave because of its attenuation caused by a material and the shape of the material, can also be easily subjected to the ultrasonic wave inspection by external access of the ultrasonic probe to the reactor pressure vessel, contrary to the conventional method.

The invention claimed is:

1. An inspection apparatus for inspecting weld zones in a reactor pressure vessel, the inspection apparatus inspecting a weld zone of a control rod drive housing and an area in proximity to the weld zone, the control rod drive housing being placed from the bottom of the reactor pressure vessel to an inside thereof, said inspection apparatus comprising:
   a probe configured to emit an ultrasonic wave toward the weld zones;
   means for positioning the inspection apparatus to more than one control rod drive housing that is adjacent to the inspection apparatus;
   a probe holding unit configured to hold the probe such that an ultrasonic wave transmitting surface of the probe is kept in direct contact with or at a constant distance from an outer surface of the reactor pressure vessel;
   a pressing unit having a spring configured to press the probe holding unit along a central axis of the control rod drive housing against the reactor pressure vessel; and
   a rotator configured to rotate the probe holding unit and the pressing unit around the central axis of the control rod drive housing.

2. The inspection apparatus according to claim 1, wherein:
   the means for positioning the inspection apparatus includes an arm and a positioning pad.

3. The inspection apparatus according to claim 1, wherein:
   the means for positioning the inspection apparatus includes an ultrasonic-wave or laser range configured for measuring each distance from one or more adjacent control rod drive housings to the inspection apparatus to compute the current position of the inspection apparatus.

4. A method for inspecting weld zones in a reactor pressure vessel, including inspecting a weld zone of a control rod drive housing and an area in proximity to the weld zone, the control rod drive housing being placed from the bottom of the reactor pressure vessel to an inside thereof, said method comprising the steps of:
   mounting an ultrasonic probe onto a probe holding unit of an inspection apparatus which comprises the probe holding unit configured to hold the ultrasonic probe such that an ultrasonic wave transmitting surface of the ultrasonic probe is kept in direct contact with or at a constant distance from an outer surface of the reactor pressure vessel, a pressing unit having a spring configured to press the probe holding unit along a central axis of the control rod drive housing against the reactor pressure vessel, a rotator configured to rotate the probe holding unit and the pressing unit around the central axis of the control rod drive housing, and an elevator configured to move up and down the ultrasonic probe, the probe holding unit, the pressing unit, and the rotator along the control rod drive housing;
   setting a focus position of the ultrasonic probe;
   mounting the inspection apparatus to the control rod drive housing;
   pressing the ultrasonic probe against the reactor pressure vessel using the elevator so that the spring of the pressing unit against the reactor pressure vessel is brought into its most contracted state;
   rotating, by the rotator, the ultrasonic probe around the control rod drive housing to a position at which inspection is to be performed;
   performing the inspection;
   lowering the ultrasonic probe to a lower portion of the reactor pressure vessel using the elevator after completion of the inspection; and
   removing the inspection apparatus from the control rod drive housing.

* * * * *